United States Patent [19]

Epstein et al.

[11] Patent Number: 4,744,130
[45] Date of Patent: May 17, 1988

[54] METHOD AND DEVICE FOR PRODUCING A CONE-SHAPED MEAT PRODUCT

[75] Inventors: Moshe N. Epstein, Olympia Fields; Peter Parthenis, Inverness, both of Ill.

[73] Assignee: Grecian Delight, Inc., Rosemont, Ill.

[21] Appl. No.: 15,368

[22] Filed: Feb. 17, 1987

[51] Int. Cl.⁴ .............................................. A22C 7/00
[52] U.S. Cl. .......................................... 17/45; 17/32; 53/122; 53/175; 53/527; 53/575
[58] Field of Search ................. 17/32, 38, 39, 49; 53/122, 175, 436, 439, 452, 527, 575, 577

[56] References Cited

U.S. PATENT DOCUMENTS

| | | | |
|---|---|---|---|
| 3,061,345 | 10/1962 | Hawley | 53/122 X |
| 3,078,628 | 2/1963 | Ready | 53/122 X |
| 3,268,948 | 8/1966 | Swift | 17/32 |
| 3,290,721 | 12/1966 | Siegal | 17/32 |
| 4,411,122 | 10/1983 | Cornish et al. | 53/122 X |
| 4,648,153 | 3/1987 | Coroneos | 53/122 X |
| 4,672,793 | 6/1987 | Terlizzi, Jr. et al. | 53/122 X |

Primary Examiner—Willie G. Abercrombie
Attorney, Agent, or Firm—Irwin C. Alter

[57] ABSTRACT

With the device and method, ground meat is pumped through an elongated discharge tube into a plastic bag at the bottom of a frustoconical-shaped mold casing. The mold casing cooperates with a pneumatic or air inflatable elastic resilient piston that causes the meat being pumped through the discharge tube to be packed tightly down to a desired texture. As more meat is pumped into the bag and mold casing, the piston when inflated has a varying diameter and the mold casing moves axially downward with respect to the resilient piston to allow for more room for meat in the mold casing and bag until a point is reached where the discharge tube along with the inflated piston are forced out of the mold casing by downward movement of the mold casing. Then the meat in the mold casing and the bag are severed and removed from the mold casing whereupon the discharge tube and air inflated piston member is repositioned with respect to the mold casing by having the mold casing moved up to a position where the discharge tube and resilient air inflated position are in their first position so that the cycle can be repeated.

13 Claims, 5 Drawing Sheets

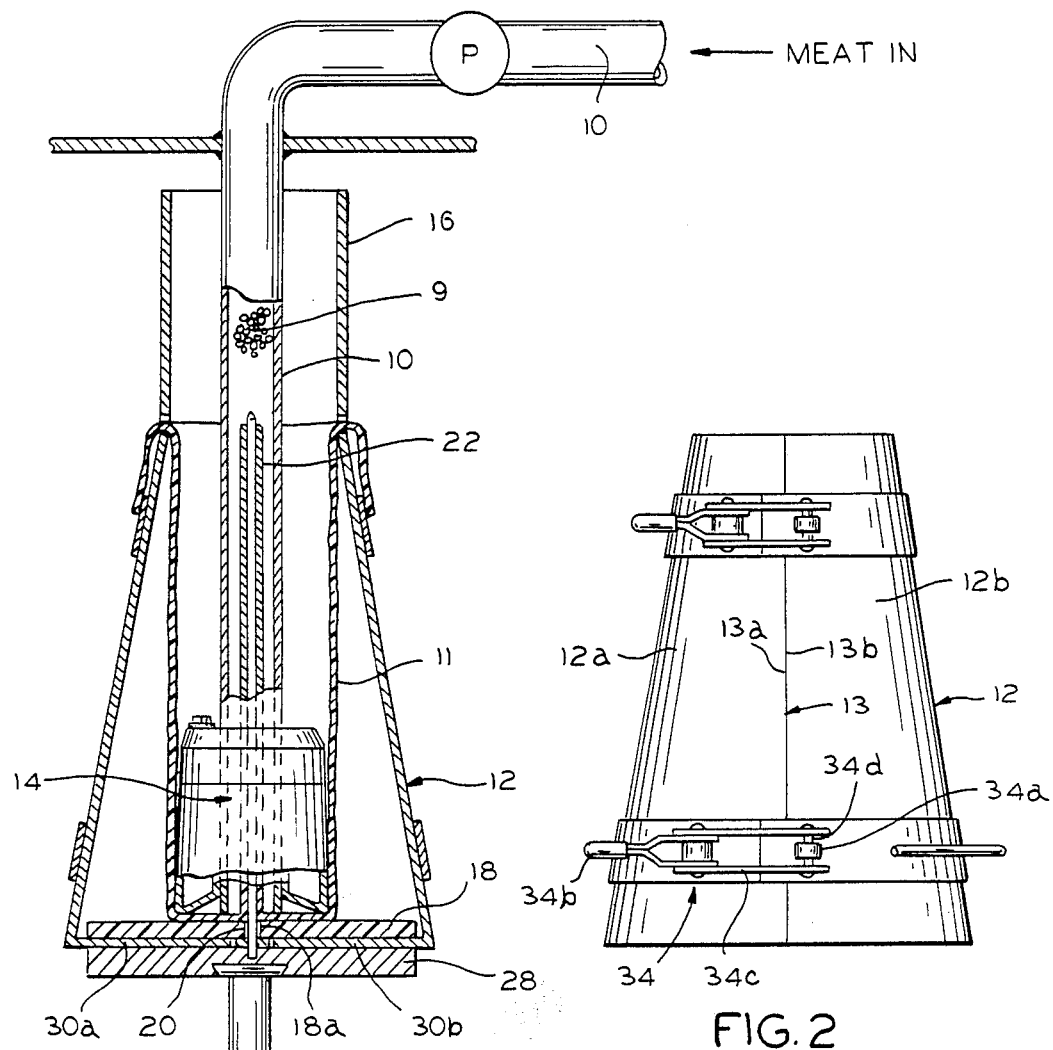
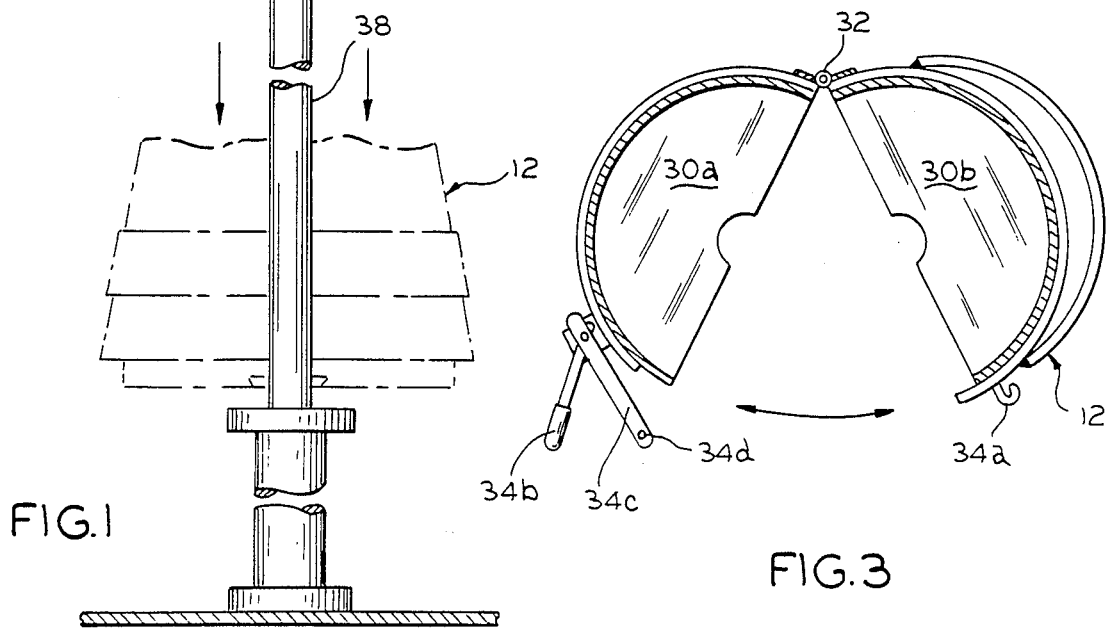
FIG.1
FIG.2
FIG.3

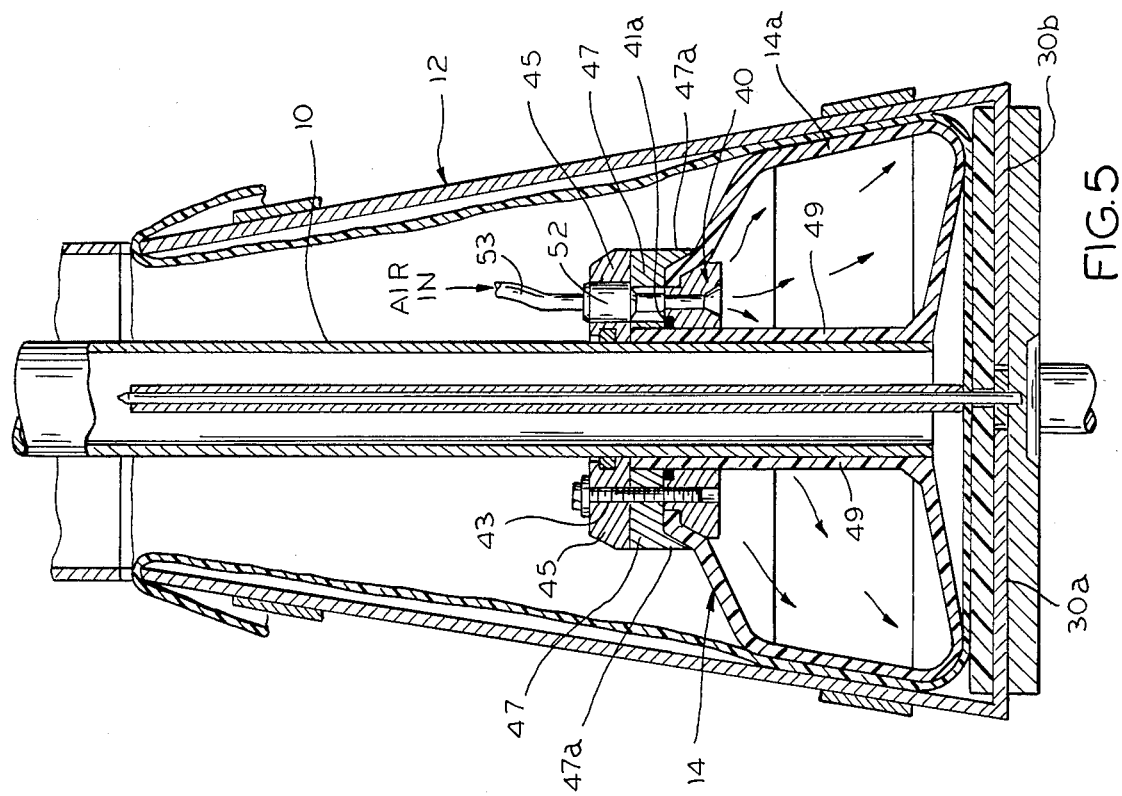
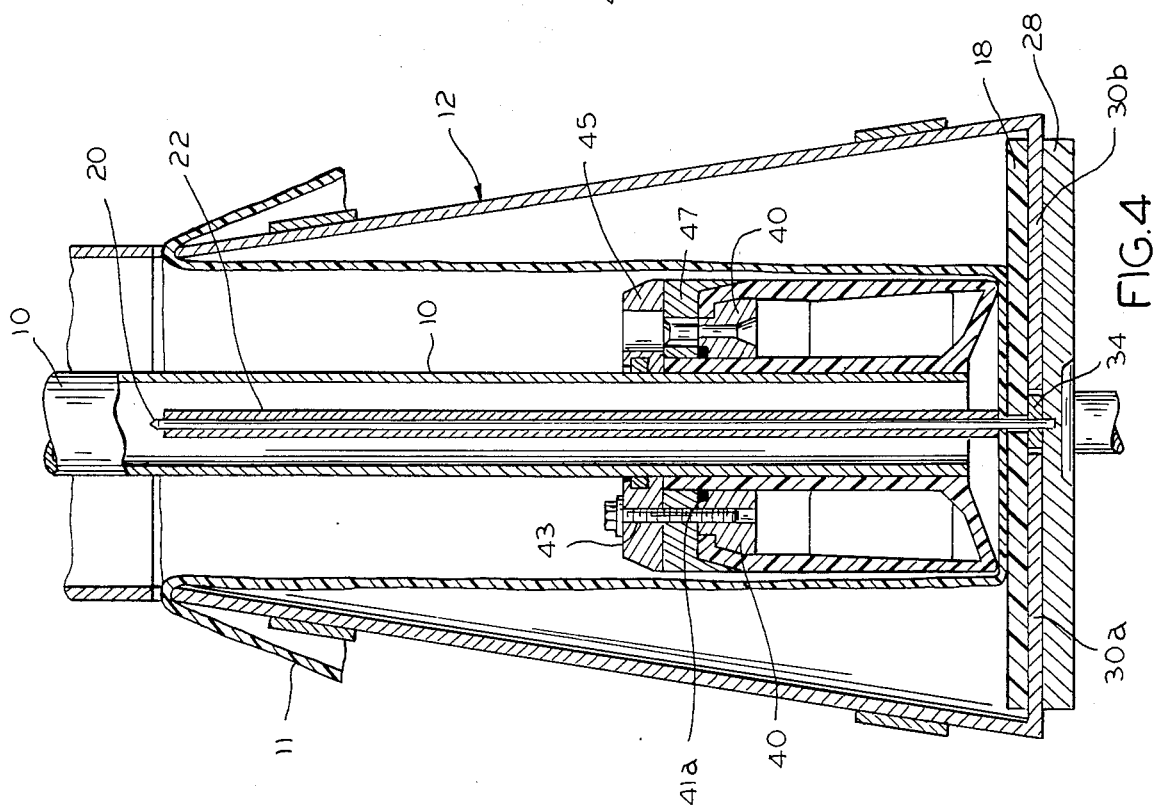

METHOD AND DEVICE FOR PRODUCING A CONE-SHAPED MEAT PRODUCT

BACKGROUND OF THE INVENTION

In the past, production of a ground meat product such as, for example, gyros, was accomplished by stacking several ground meat patties up, one on top of the other and thereafter, the remaining cylinder was cut with a knife to achieve the frustoconical tapered shape. To produce a frusto-conical shape as is traditionally required in gyros, the stacked, huge hamburger-like patties which are stacked up to form a meat cylinder are turned into a cone by means of a knife cutting the meat. Other methods that were used included stuffing and pumping the meat into a cylinder and thereafter a band saw could be applied to taper the meat to a desired shape of a tapered or frusto-conical cone. U.S. Pat. No. 4,363,822 issued to Kleptz shows meat being pumped into a cylinder to form a meat product of a predetermined shape. However, a frusto-conical shaped mold casing is not shown, nor is there any way of accomplishing this through modifying the structure without visualizing the invention as disclosed herein.

Thus, in all the known methods of making gyros prior to this time, a knife or other cutting instrument is necessary to achieve the frusto-conical shaped meat. Where a knife is used or, for that matter even a band saw, to perform the cutting operation for means of tapering, it is not only expensive and tedious but the end product is inconsistent.

SUMMARY OF THE INVENTION

The present invention is directed to an improved method and apparatus for producing a frusto-conical shaped meat product such as is required with gyros which eliminates the above-mentioned disadvantages by providing a meat product that can be used for gyros which is tapered by means of molding.

While the method and apparatus of the invention are desirable for producing gyros products, the method and apparatus of the invention are ideally suited for producing other meat products where it is desired to have a frusto-conical shape.

In accordance with one embodiment of the invention, a meat product such as gyros is produced by taking ground meat and pumping it from a mixer through a discharge tube into a plastic bag at the bottom of the frusto-conical shaped mold casing when the casing is in its first position. The casing is supported by an end plate that corresponds to the diameter of one end of the desired gyros product. The end plate has a lower piston rod depending therefrom which is operatively associated with a lower piston that causes a biasing force on the plate while the mold is being filled with meat and actuated from a first position to a second position. As the meat is packed into the mold casing and is filling it, the mold casing is moved to its second position by the combination of the force of the meat created by the biasing resistance of the air inflated resilient piston and the force of the meat overcoming the biasing force of the lower piston. The lower piston repositions the mold casing to the first position as will be explained hereinafter.

The mold casing has an air inflated resilient piston slidably and sealingly associated with the inner periphery of the mold casing and as the meat is pumped through the discharge tube to the mold casing, the resistance of the air inflated resilient piston causes the meat to be packed tightly to the desired texture as more meat is pumped into the bag and mold casing. The mold casing moves axially with respect to the air inflated resilient piston with its periphery making sliding and sealing contact with the inner periphery of the mold casing. The relative movement of the mold casing and piston not only allows for more room for the meat in the mold casing and bag, but also the diameter of the air inflated resilient piston changes to conform to the contour of the mold casing, depending at which point the mold casing is located as it moves from the first position to the second position.

The meat in the mold casing can be severed from the meat in the discharge tube. Thereafter, the meat in the mold casing and the bag are removed from the mold casing by opening the mold casing whereupon the discharge tube and inflated resilient piston member are repositioned to their first position with respect to the mold casing.

When the bag is filled and the meat is severed from the discharge tube, the pump is deenergized so that more meat does not flow therefrom and the bag of formed meat is then removed from the mold casing by opening the mold casing.

The mold casing is preferably made so that it is held together along one of its longitudinal sides by means of locking mechanisms that can be released. The mold casing is preferably hinged along another of its longitudinal sides so that when it is unlocked, it is just swung open.

With this type of device and process, the meat can be formed into a frusto-conical shape, which has different diameters and is packed down by means of the flexible inflatable piston so that the frusto-conical shaped meat product is achieved without having to use the operation of cutting.

It is therefore an object of this invention to provide a new and improved molding process for making gyros that is more efficient and less expensive.

It is further an object of this invention to provide a new and improved process and device which makes gyros by using a unique resilient inflated piston that has varying diameters that can conform to the different diameters of a frusto-conical mold.

Other features and advantages of the invention will be apparent from the following description, accompanying drawing and appended claims wherein:

BRIEF DESCRIPTION OF THE DRAWINGS

FIG. 1 is a partial half-sectional view showing the mold casing in its first position cooperating with the discharge tube and lower piston and illustrating the resilient inflatable piston prior to inflation;

FIG. 2 is a side elevational view of the mold casing;

FIG. 3 is an end view of the mold casing showing it in an open and unlocked position and revolving around the hinges of one longitudinal side thereof;

FIG. 4 is an exploded half-sectional view showing the mold casing with the bag and inflatable piston at the initial part of the cycle in its first position where the inflatable piston has not yet been inflated;

FIG. 5 is an exploded half-sectional view similar to FIG. 4 after the piston valve has been inflated;

DESCRIPTION OF THE PREFERRED EMBODIMENT

Figure 6:
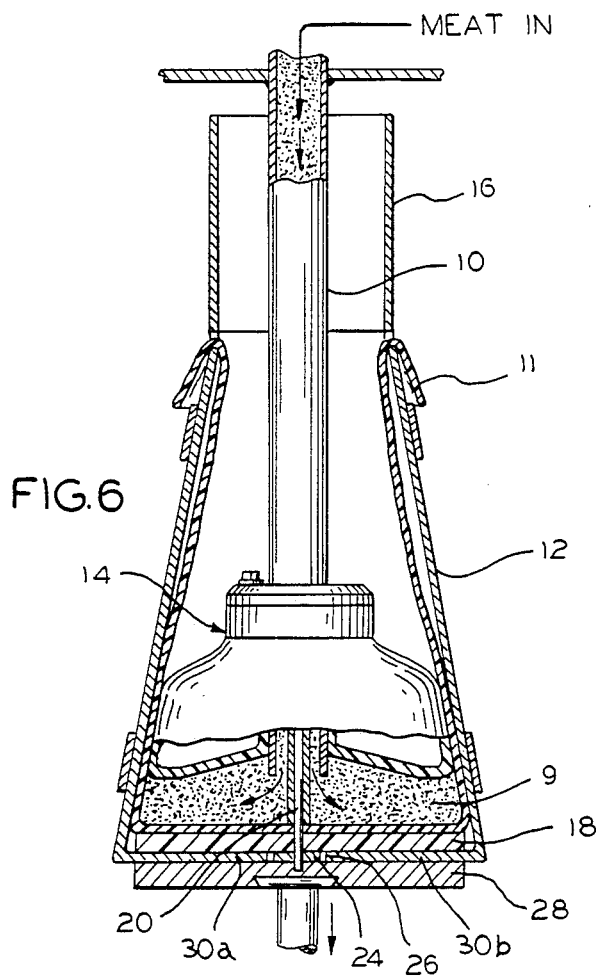
FIG. 6 is a similar view to FIGS. 4 and 5 wherein the inflated piston has been inflated and ground meat has been fed into the bag and mold casing and the force of the inflated piston combined with the force of the meat has caused the mold casing to move downward toward its second position.

Referring now to the drawings wherein like characters of reference indicate corresponding parts throughout, the inventive process and device for performing the process is shown diagrammatically in FIG. 1 wherein ground meat 9 that has been ground and mixed is pumped through an elongated discharge tube 10 into the bottom of a plastic bag 11 that is supported at the bottom of a frusto-conical shaped mold casing 12 which has a first position and a second position. The first position of the mold casing 12 is shown in FIG. 1 in solid lines and the second position is shown in FIG. 1 by the phantom lines. As seen in FIG. 5, the mold casing 12 cooperates with an air inflatable resilient piston 14 so that when meat is pumped through the discharge tube 10 and the air inflatable piston is sealingly and slidably associated with the inner periphery of the mold casing 12 and the meat 9 being discharged from the discharge tube is caused to be packed tightly in the bag and mold casing 12.

Figure 7:
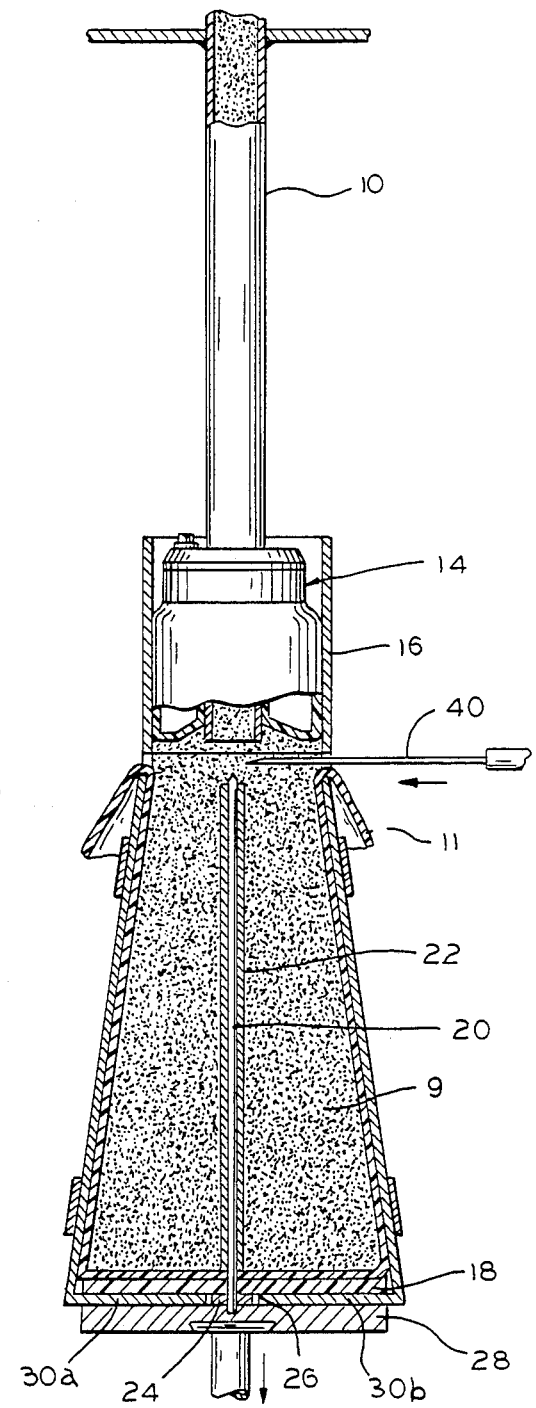
FIG. 7 is a similar view to FIG. 6 showing the mold casing moved downward to its second position where the inflated piston and discharge tube are in a position that allows the meat to be severed from the meat that is still in the discharge tube.
Figure 8:
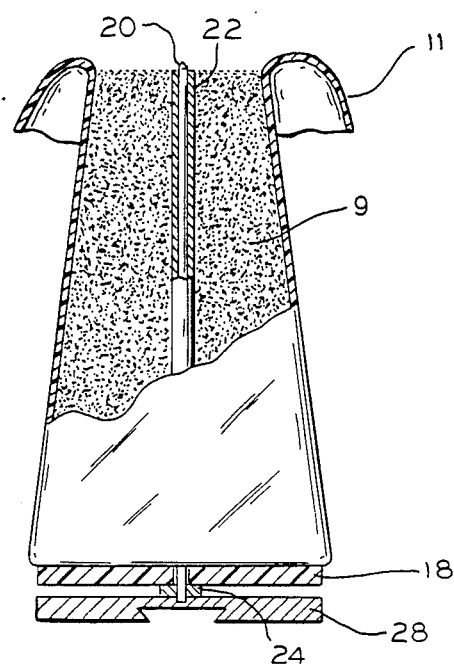
FIG. 8 is a similar view to FIG. 7 showing the meat severed from the discharge tube after the mold casing has been removed to allow for removal of a bag and meat.

As seen from FIGS. 6, 7 and 8, the combined force of the resilient inflatable piston 14 blocking the ground meat as well as the force from the steady inflow of ground meat, causes the mold casing 12 to be moved downward from its original first position to the second position shown in section in FIG. 7 and in phantom in FIG. 1 as well. In position 2, the meat has completely filled the bag and the meat has forced the mold casing 12 down to a point where the discharge tube 10 as well as the resilient inflatable piston is no longer in the mold casing 12. The resilient inflatable piston 14 at this point has been squeezed sufficiently, so that it can fit in the cylindrical hood 16 as shown in FIG. 7.

Figure 11:
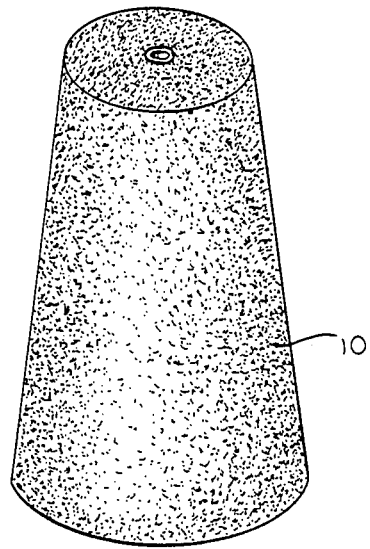
FIG. 11 is a pictorial view showing the meat after the bag and meat have been removed therefrom.

As seen from FIG. 1, the mold casing 12 has a platform 18 on the inside thereof that has an aperture 18a formed therein through which the skewering rod 20 protrudes for purposes of positioning a small skewering tube 22 that is located on the inside of the bag and positioned axially in the casing and bag in order that the meat finally is packed tightly around the tube 22 as shown in FIG. 11.

Figure 10:
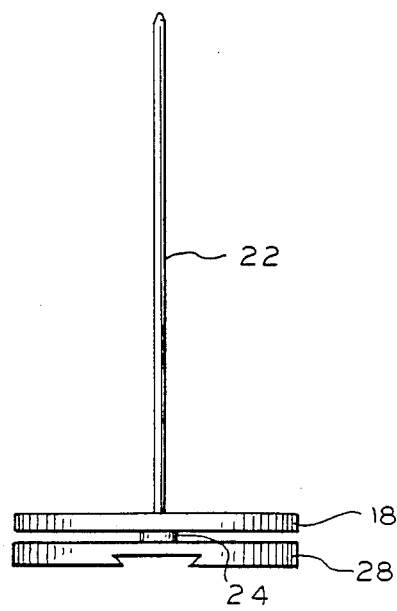
FIG. 10 is a side elevational view of the bottom plate and skewering rod.

A spacer 24 is positioned in the lower end of the mold casing 12 at opening 26 which is formed by the bottom halves of 30a and 30b of mold casing 12. A lower platform 28 is associated with the spacer 24 by sandwiching it between the bottom of platform plate 18. Platform 18 has the rod 20 protruding therethrough; the rod being anchored in platform 28 as shown in FIGS. 6 and 10. The rod 20 is positioned axially with respect to the mold casing 12 and can be mounted and held by fitting into the space between the platforms 28 and 18 as illustrated in FIGS. 6 and 7.

As seen from FIGS. 1, 2 and 3, the mold casing 12 is frusto-conical and is split in half longitudinally and has a bottom 30 which is split into two halves 30a and 30b. The mold casing is hinged together by hinge means 32 which is along one side of the mold casing halves 12a, 12b so that the mold casing can be opened or closed at the parting line 13 by pivoting so that the edges 13a and 13b are held together as shown in FIG. 3. Lock means 34 are provided for holding the mold casing together. The lock means 34 each have a hook 34a on one half of the casing, a handle 34b and link 34c on the other half of the casing and the lock means is actuated to a closed position by associating the hook 34a and pin 34d of the link 34c and pulling the handle 34b to the locked position.

Figure 9:
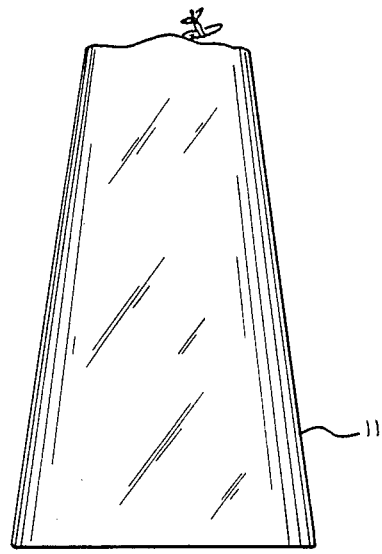
FIG. 9 is a side elevational view showing the end product of the meat disposed in a bag after it has been bound for shipping or storage.

Lower piston rod 36 which depends from the platform plate 28 is operatively associated with the lower piston 38 so that the piston opposes the force of the mold casing 26 as it is caused to move from its first position to its second position shown in FIG. 1. After the piston rod 36 and lower piston 38 is moved to its second position and the meat is severed from the meat remaining in the discharge tube, as illustrated in FIG. 6, a knife such as 40 can be used to cut the meat at the top as shown in FIG. 7. To release the meat, the mold casing 12 is unlocked by means of actuating the locks 34 and the halves 30a and 30b are then pivoted open so that a frusto-conical shape of meat can be removed from the mold casing. As seen from FIG. 10, the entire platform and pin arrangement is removed so that thereafter the frusto-conical shape of meat in the bag has the tube 22 remaining in the meat 9 and it is bagged as shown in FIG. 9. With this arrangement the meat can be put on a rotating spit, as is necessary in making gyros.

As seen from the drawings, the air inflatable resilient piston 14 can be made of any elastic, rubber-like material so that it can be inflated like a balloon to sealingly and slidably make contact with the various cross-sectional diameters of the frusto-conical shape. The material of the inflatable resilient piston 14 must be flexible enough so that it can be squeezed to fit into the hood 16 of the arrangement in order to allow for severing of the meat as shown in FIG. 7.

In FIGS. 4 and 5, a cross-section of the air inflatable resilient piston 14 in various stages is illustrated most clearly. It can be seen that the air inflatable resilient piston 14 is removably and fixedly attached to the discharge tube 10 by means of the disc-shaped collar 40 which has a seal ring 41a disposed therein that seals the air resilient piston 14 at its central opening so that the collar 40 fits around the discharge tube 10. There is an aperture that receives a threaded fastener 43 that is attached to a piston plate 45 and lock plate 47. The lock plate 47 as well as the piston plate 45 and lock collar 40 has a valve opening 51 and valve 52 disposed therein which can be associated with compressed air by means of the air tube 53 for purposes of selectively inflating the inflatable resilient piston 14 and thereafter deflating same. The air inflatable resilient piston 14 includes a rigid cylindrical plastic portion 49 that is bonded to the discharge tube and has extending from it the resilient elastic which is fixedly attached to the disc-shaped collar 40 by means of a pocket formed by a depending flange 47a of the lock plate 47.

Thus, when the threaded fastener 43 is tightened, the resilient material is clamped between the pocket formed by the piston plate 45 and the lock plate 47. Any type of well known valve arrangement for controlling the egress and ingress of air attached to a compressed air source can be used for the inflatable resilient piston 14. Also, as long as the piston can be expanded by some pneumatic means, whether it be by compressed air or otherwise, an embodiment of the invention can be realized.

Figure 13:
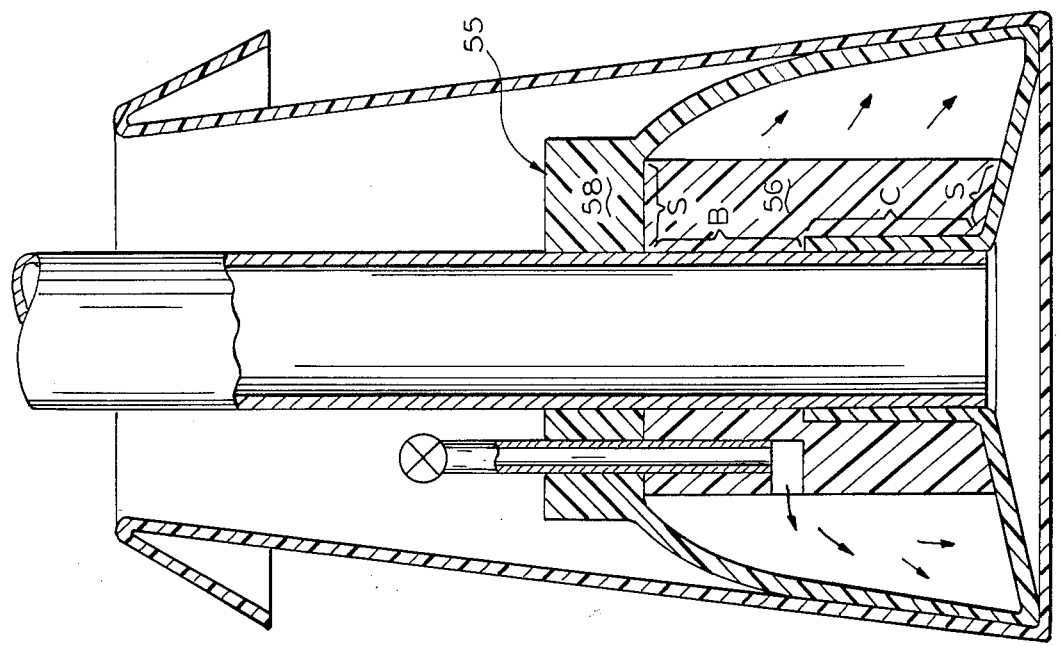
FIG. 13 is a similar view to FIG. 5 after the piston valve of FIG. 12 has been inflated.
Figure 12:
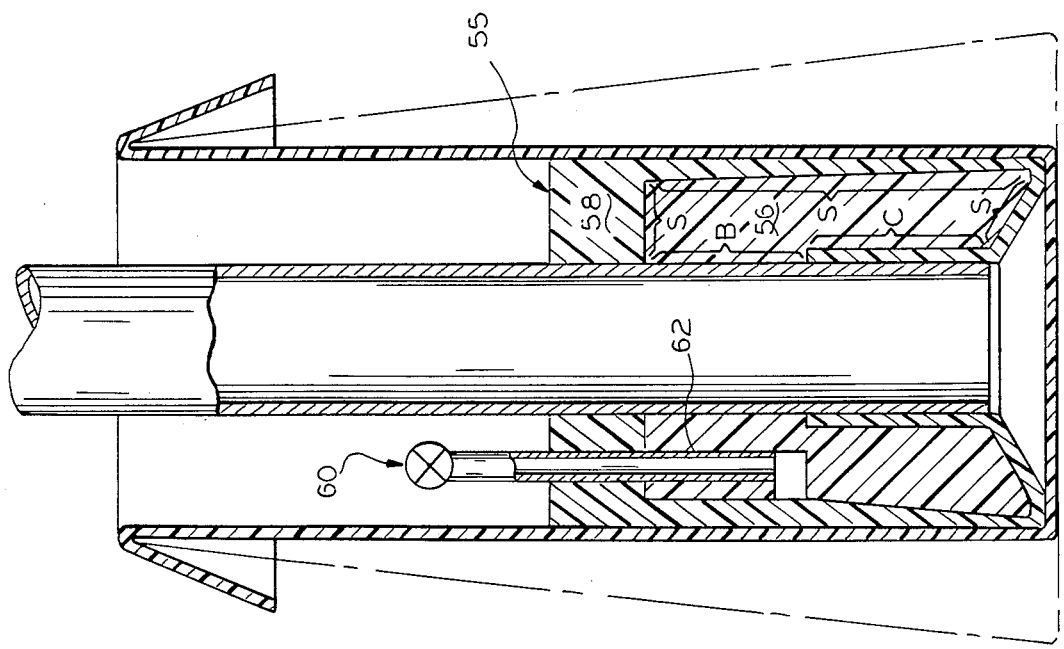
FIG. 12 is a similar half-sectional view to FIG. 4 showing another type of inflatable piston prior to inflation.

In FIGS. 12 and 13 a half section of a modified inflatable piston 55 is shown wherein the flanges and cavity of the previously described resilient piston 14 can be eliminated by employing solid cylindrical molded parts 56, 58 that are separated when the resilient piston 55 is inflated.

As seen from FIG. 12, the modified inflatable piston 55 is shown with a first cylindrical molded part 56 and a second outer cylindrical molded part 58 that is expanded to the inflated position shown in FIG. 13. The first inner molded part 56 is directly molded and bonded to the elongated cylindrical discharge tube 10 as an initial step to constructing the modified inflatable piston 55. Then the first molded part 56 together with the discharge tube 10 is placed in another mold (not shown) where the second part is molded with the first molded part so that while it is bonded to the first molded piece 56 at the portion indicated by "C", it is not bonded at the portion marked "S" where anticohesive material is applied to keep the first and second molded parts from bonding.

To inflate the piston, an air means (not shown) controlled by air valve 60 preferably has a conduit 62 that forces air through the first molded part 56, outward against the second molded part 58 which expands to the position shown in FIG. 13 which is similar to FIGS. 5 and 6. The second molded part 58 also sealingly and slidably varies to the cross-section of the casing at different positions of the casing.

The inflatable pistons disclosed herein can be made from any flexible elastomers that can fulfill the functions disclosed. These are readily apparent to persons skilled in the art who regularly work with resilient moldable materials that would be acceptable to the Food & Drug Administration. In the preferred embodiment of the inflatable piston 55, the elastomer can be classified as a polyurethane per FDA Regulation 21 CFR 177.2600 which covers elastomers for food contact applications with aqueous fatty and dry goods. The specifications include ASTM KAS 41093 AE HARDNESS 50 SHORE A, TENSILE STRENGTH 3600 psi, Elongation 520% (100%) Tensile Modulus 230 psi (⅛" or 3/16"), Compression Set 1.27% (with compression applied by ASTM D395 Method B).

The material is designed with dimensions that enable it to be expanded when inflated and thereafter when the air is exhausted it returns back to the position in FIG. 12.

The modified inflatable piston 55 has advantages over the inflatable piston 14 shown in FIGS. 4 and 5 because many parts are eliminated and it is easier to keep clean.

As can be seen, there are no flanges or metal fasteners needed due to the direct bonding of the parts of the inflatable piston 55. In the food industry, ease of cleaning is important.

Thus, when operating the device described and shown in the accompanying drawings, ground meat which has been mixed and ground in a conventional way is pumped through an elongated discharge tube into a plastic bag or the like that has been supported at the bottom of the frusto-conical mold casing. At the beginning of the cycle, the inflatable resilient piston is inflated to a point where it forces against a plastic bag and the inner periphery of the mold casing in a sealing and slidable relationship. The mold casing 12 at the beginning of the cycle is in a first position and thereafter it is forced to a second position by means of the meat forcing the mold casing downward thereby overcoming the biasing force of the lower piston 38 which provides less resistance to movement than the friction of the air inflated resilient piston which is resisting the inflow of the meat and causing it to be tightly packed. Once the mold casing is forced down to the second position, the meat is severed from the meat in the discharge tube, the mold casing is opened and removed from its platform whereupon the meat and its platform are removed from the device and thereafter the platform and rod are removed from the bag of meat which in turn is bound and ready for freezing or other processes.

Thus, it will be seen that the meat product produced in accordance with the present invention has the desirable features and advantages of having a frusto-conical meat product without the usual waste involved with cutting away the meat to shape it. Also, a new and improved method involving the novel inflatable resilient piston has been described.

When it is desired to repeat the cycle, the mold casing 12 and lower piston 38 is brought back to its original position and is locked. The mold casing 12 is clamped closer after the platform 18 has been positioned inside with its spacer 24 and the platform 28 is sandwiching and engaging the halves 30a and 30b of the lower end 26 of the mold casing 12 as shown in the drawings in FIGS. 6 and 8. Then the bag is positioned for filling by being placed with its open end being folded over the top of the mold casing and its lower end and supported by the platforom so that the skewering rod 20 is protruding through the bag along with tube 22. The lower piston 38 is positioned upward from the place where the mold casing is in the second position to the place where it is in the first position and is then ready to start the cycle.

It should be understood that the present invention may be embodied in other forms than the specific preferred embodiments described above without departing from its spirit or essential characteristics. The present preferred embodiments are, therefore, to be considered in all respects as illustrative and not restrictive, the scope of the invention being indicated by the claims rather than by the foregoing description. All changes which come within the meaning and range of the equivalents of the claims, including those which would be known to those of ordinary skill in the art, are therefore intended to be embraced therein.

What is claimed is:

1. A device for manufacturing a frusto-conical shaped meat product having a varying cross-sectional diameter by means of a moving mold casing that receives ground meat under pressure, comprising:

a mold casing having a frusto-conical shape that conforms to the shape and cross-section of the desired meat product, a flexible, resilient, hollow piston disposed in the mold casing and slidably and sealingly conforming to the different cross-sections of the inner periphery of the frusto-conical shaped mold, means to supply meat under pressure to said mold casing, said resilient piston being disposed to oppose the force of the meat being fed into said mold casing, said casing cooperating with said resilient piston by moving to allow for filling the casing and compressing the meat in said casing.

2. A device for manufacturing frusto-conical shaped meat products as defined in claim 1, wherein said piston has a central member, a first molded part that is directly bonded to and fixedly attached to the circumference of said central member, a second molded part having portions thereof that are inflatable to a shape that sealingly and slidably varies and conforms to said different cross-sections of said inner periphery of said mold casing.

3. In a device for manufacturing frusto-conical shaped meat products, as defined in claim 2, wherein air means are provided to communicate with said first molded part and second molded part, whereby said air means causes air to flow into and out of said first molded part into said second molded part to expand certain portions of said second molded part to make said piston slidably and sealingly cooperate with said inner periphery of said mold casing.

4. In a device as defined in claim 1, said flexibly resilient piston including a pneumatically expansible body whose outer periphery sealingly and slidably cooperates with said inner periphery of said mold casing.

5. A device as defined in claim 4, wherein said flexible resilient piston includes an air expansible body.

6. A device as defined in claim 5, wherein said flexible resilient piston is connected to air means and compressed valve means to control the air in said resilient piston means.

7. A device for manufacturing a frusto-conical shaped meat product having a varying cross-sectional diameter comprising:

an axially movable mold casing having an inner periphery with a frusto-conical shape conforming to the shape and cross-section of the desired meat product, a flexibly inflatable resilient piston having a shape that sealingly and slidably varies and conforms to said different cross-sections of the inner periphery of the frusto-conical shape of the mold casing, said piston slidably and sealingly cooperating with said inner periphery of said mold casing to compress said meat when said mold casing moves axially relative to said resilient piston and the cross-sectional diameter varies in accordance with the location of said piston relative to the frusto-conical mold casing.

8. A device for manufacturing frusto-conical shaped meat products as defined in claim 7, wherein said piston has a central member, a first molded part that is directly bonded to and fixedly attached to the circumference of said central member, a second molded part having portions thereof that are inflatable to a shape that sealingly and slidably varies and conforms to said different cross-sections of said inner periphery of said mold casing.

9. In a device for manufacturing frusto-conical shaped meat products as defined in claim 8, wherein air means are provided to communicate with said first molded part and second molded part, whereby said air means causes air to flow into and out of said first molded part into said second molded part to expand certain portions of said second molded part to make said piston slidably and sealingly cooperate with said inner periphery of said mold casing.

10. A device as defined in claim 9, wherein said mold casing is axially movable from a first position to a second position in response to ground meat that is fed into said casing under pressure said mold casing axially moving relative to said piston from a first position to a second position where said casing can be opened and said meat removed.

11. A device as defined in claim 10, comprising:

a base plate for supporting said meat in said mold casing, said mold casing being removably interlocked with said base plate when having meat fed to it, said mold casing being hinged whereby it can be opened when it is desired to remove said meat therefrom after it has been compressed to its frusto-conical shape.

12. In a device for manufacturing a frusto-conical shaped meat product having a varying cross-sectional diameter, a mold casing having an inner periphery of frusto-conical shape conforming to the shape of the desired meat product, the improvement comprising:

an inflatable resilient piston having a shape that varies and conforms to the different diameter cross-sections of the frusto-conical shape of the mold casing, said piston cooperating with said inner periphery of said molding device to tightly pack said meat when said mold casing moves axially relative to said inflatable piston and the cross-sectional diameter of said piston varies in accordance with the location of the piston relative to the frusto-conical mold casing.

13. A method of producing a frusto-conical shaped meat product having a varying cross-sectional diameter wherein there is a means for supplying ground meat under pressure into a frusto-conical mold casing that can be opened to remove said ground meat, said mold casing conforming to the shape and cross-section of a desired meat product, and a pneumatic inflatable resilient piston that slidably and sealingly engages the inner sides of the mold casing as meat supplied to said casing and forces the mold casing to move relative to said flexible resilient piston from a first position to a second position where said piston is removed from said mold casing, comprising the steps of:

supplying ground meat to bags under pressure;

supporting and encasing the bag in said frusto-conical mold casing;

inflating said resilient inflatable piston when initiating supplying of said ground meat to said mold casing, causing said mold casing to move axially and relative to said inflatable resilient piston from said first position to said second position in order to allow said ground meat to fill up said bag and conform to the inner periphery of said mold casing, tightly packing the ground meat in said mold casing by keeping said resilient inflatable piston sealingly and slidably biased against and conforming to the inner periphery of said mold casing as said meat is being fed to the mold casing under pressure, and opening said mold casing whereby said meat is removed therefrom.

* * * * *